United States Patent
Kleeman et al.

(10) Patent No.: US 10,416,351 B2
(45) Date of Patent: Sep. 17, 2019

(54) GENERATING PROBABILISTIC ESTIMATES OF RAINFALL RATES FROM RADAR REFLECTIVITY MEASUREMENTS

(71) Applicant: THE CLIMATE CORPORATION, San Francisco, CA (US)

(72) Inventors: Alexander Kleeman, San Francisco, CA (US); Valliappa Lakshmanan, Bellevue, WA (US); Beth Reid, Berkeley, CA (US)

(73) Assignee: The Climate Corporation, San Francisco, CA (US)

( * ) Notice: Subject to any disclaimer, the term of this patent is extended or adjusted under 35 U.S.C. 154(b) by 973 days.

(21) Appl. No.: 14/945,282

(22) Filed: Nov. 18, 2015

(65) Prior Publication Data

US 2017/0075034 A1  Mar. 16, 2017

Related U.S. Application Data

(60) Provisional application No. 62/216,426, filed on Sep. 10, 2015.

(51) Int. Cl.
*G01W 1/10* (2006.01)
*G06N 7/00* (2006.01)
(Continued)

(52) U.S. Cl.
CPC .............. *G01W 1/10* (2013.01); *G01W 1/14* (2013.01); *G01S 13/95* (2013.01); *G06N 7/005* (2013.01); *G06Q 50/02* (2013.01); *Y02A 90/18* (2018.01)

(58) Field of Classification Search
CPC .......... G01W 1/10; G01W 1/14; G06N 7/005; G06Q 50/02; Y04S 10/54; G01S 13/95; Y02A 90/18
See application file for complete search history.

(56) References Cited

U.S. PATENT DOCUMENTS

| 4,660,038 A | 4/1987 | Greneker, III |
| 5,721,679 A | 2/1998 | Monson |

(Continued)

OTHER PUBLICATIONS

Koshinchanov et al., Precipitation intensity probablilty distribution modelling for hydrologicanl and construction desigh purposes, 2008, IOP Conference Series: Earth and Environmental Science, pp. 1-12 (Year: 2008).*

Cosma et al., Markov Chains and Monte Carlo Methods, Mar. 12, 2010, African Institute for Mathematical Sciences, Chapter 2, pp. 23-30 (Year: 2010).*

(Continued)

*Primary Examiner* — Sujoy K Kundu
*Assistant Examiner* — L. Anderson
(74) *Attorney, Agent, or Firm* — Elliot H. Karlin; Hickman Palermo Becker Bingham LLP

(57) ABSTRACT

A method and system for generating probabilistic estimates of precipitation intensity from radar reflectivity measurements is provided. In an embodiment, an agricultural intelligence computer system receives radar reflectivity measurements for a particular location from an external data source. The agricultural intelligence computer system constructs a probability distribution of drop sizes describing the probability that the precipitation included drops of various sizes based on the radar reflectivity measurements. The agricultural intelligence computer system samples a plurality of values from the probability of distribution of drop sizes and uses the plurality of values and the radar reflectivity measurements to compute a plurality of rainfall rates. Based on the plurality of rainfall rates, the agricultural intelligence computer system constructs a probability distribution of rainfall rates for the particular location.

32 Claims, 8 Drawing Sheets

(51) Int. Cl.
*G01W 1/14* (2006.01)
*G06Q 50/02* (2012.01)
*G01S 13/95* (2006.01)

(56) References Cited

U.S. PATENT DOCUMENTS

| | | |
|---|---|---|
| 2006/0037520 A1 | 2/2006 | Tsing |
| 2012/0086596 A1 | 4/2012 | Insanic et al. |
| 2012/0303278 A1 | 11/2012 | Dannevik et al. |
| 2013/0271313 A1 | 10/2013 | Venkatachalam et al. |
| 2014/0012732 A1 | 1/2014 | Lindores |
| 2015/0145717 A1 | 5/2015 | Lim |
| 2016/0253595 A1* | 9/2016 | Mathur .................. G06Q 50/02 706/12 |

OTHER PUBLICATIONS

European Patent Office, "Search Report" in application No. 15782556.3-1601, dated Oct. 19, 2017, 9 pages.
European Claims in application No. 15782556.3-1601, dated Oct. 2017, 6 pages.
The International Bureau pf WIPO, "International Preliminary Report on Patentability", in application No. PCT/US2016/050247, dated Mar. 13, 2018, 8 pages.
Current Claims in application No. PCT/US2016/050247, dated Mar. 2018, 11 pages.
International Searching Authority, "Search Report" in application No. PCT/US16/50247, dated Nov. 16, 2016, 14 pages.
Current Claims in application No. PCT/US16/5024, dated Nov. 2016, 10 pages.

* cited by examiner

Fig. 2
(a)
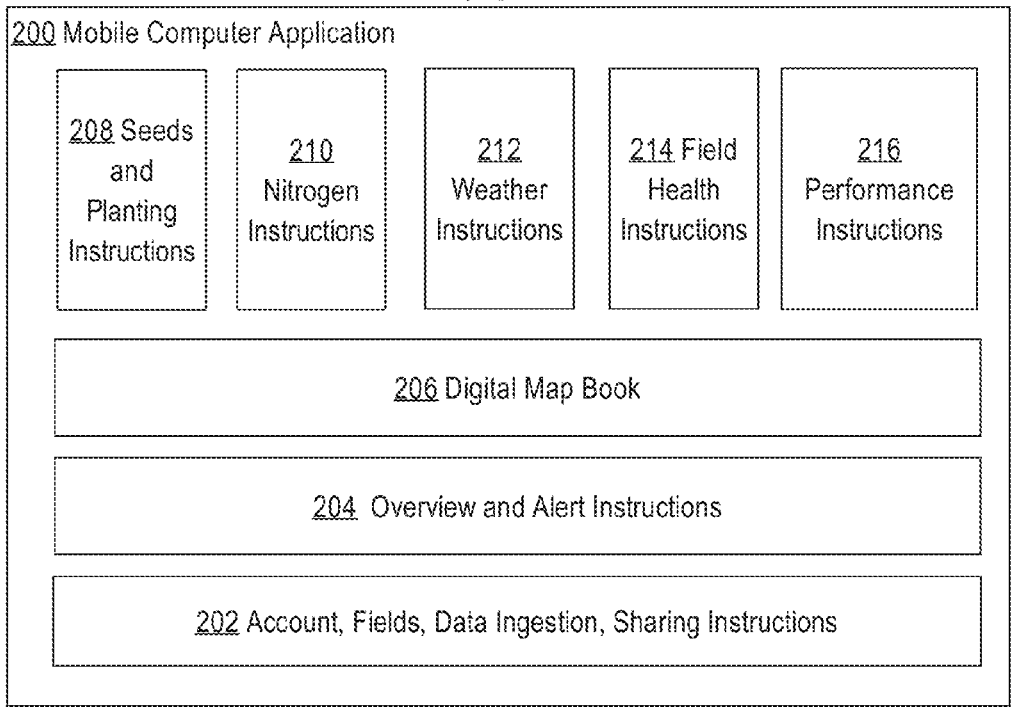
(b)
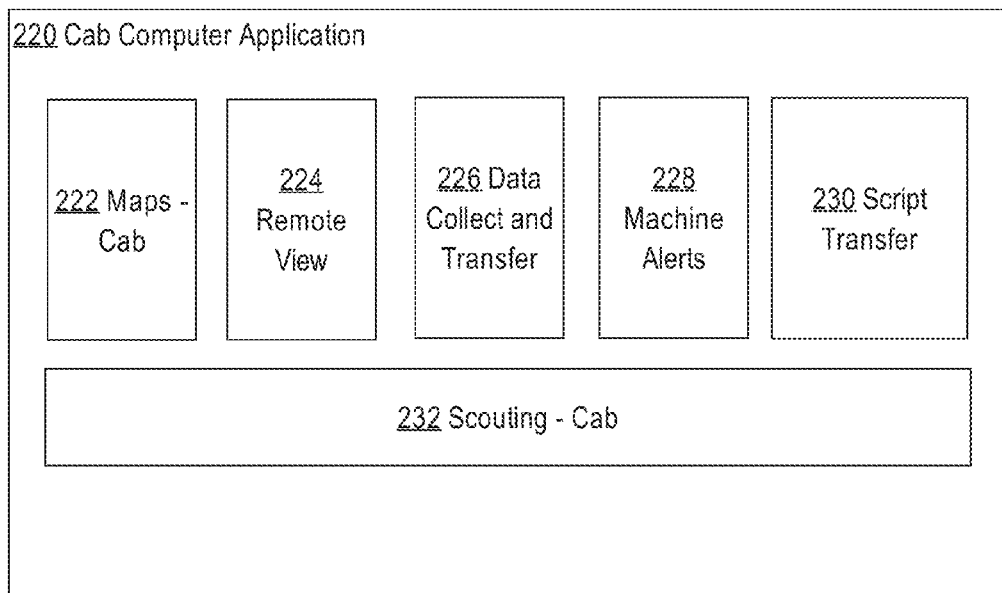

GENERATING PROBABILISTIC ESTIMATES OF RAINFALL RATES FROM RADAR REFLECTIVITY MEASUREMENTS

BENEFIT CLAIM

This application claims the benefit of provisional application 62/216,426, filed Sep. 9, 2015, the entire contents of which is hereby incorporated by reference as if fully set forth herein, under 35 U.S.C. § 119(e).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure generally relates to computer systems useful in climatology and agriculture. The disclosure relates more specifically to computer systems that are programmed or configured to generate probabilistic estimates of precipitation using radar reflectivity data received from radar devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Water, often received via rain or other precipitation, is an essential element to life. For farmers, rainfall is a large factor in determining how much water a crop receives, thereby altering the potential yield for the crop. While rainfall has many positive effects, such as giving life to crops, large quantities of rainfall can also have severe repercussions, such as by causing floods or resulting in standing or ponding water that can inundate seedlings or mature crops. Thus, accurate measurements of rainfall can be extremely important, both to maximize gains from the rainfall and minimize risks from an overabundance of rainfall.

Rainfall is generally measured using one of two approaches. One approach for measuring rainfall involves utilizing physically placed rain gauges. The rain gauges are set at a variety of locations and are used to gather precipitation and measure the amount of precipitation received at the rain gauge over a period of time. While rain gauges create accurate measurements of the amount of precipitation received at the rain gauge, rain gauge data is only available where a rain gauge has been physically placed. Precipitation amounts in non-gauge locations may be inferred from the measurements at surrounding gauge locations, but the inferred precipitation amounts do not contain the same levels of accuracy as the gauge measurements.

A second approach to measuring rainfall involves utilizing radar data to calculate the rainfall. Generally, a polarized beam of energy is emitted from a radar device in a particular direction. The beam travels un-disturbed before encountering a volume of air containing hydrometeors, such as rainfall, snowfall, or hail, which causes the beam to scatter energy back to a radar receiver. Based on the amount of time it takes for a radar beam to return, the distance between the radar device and the volume of air containing hydrometeors is computed. The amount of energy that is received by the radar receiver, also known as the reflectivity, is used to compute the rainfall rate. Often, the relationship between the reflectivity and the actual rainfall rate is modeled through the Z-R transformation:

$$Z = aR^b$$

where Z is the reflectivity and R is the actual rainfall rate. The parameters for the Z-R transformation may be identified through measurements for rain gauges for a particular area and type of storm.

A drawback with using radar reflectivity to measure the rainfall rate is that the radar reflectivity at best creates an estimate of the actual rainfall. While radar reflectivity is generally understood to be directly related to the rainfall rate, a wide variety of atmospheric conditions are capable of leading to the same reflectivity, yet producing different rainfall rates. The differences in drop sizes specifically can lead to variations in the rainfall rate while producing the same reflectivity. For example, a small number of large drop sizes will produce the same reflectivity data as a large number of smaller rainfall drops, but a large number of smaller drop sizes will generally produce more precipitation on the ground than a small number of large drop sizes.

Many hydrologists attempt to solve the inaccuracies in measurements of rainfall rates with radar devices by employing calibration techniques to ensure that the radar measurements that are received are as accurate as possible. The persistent problem is that the actual error in the rainfall rates is not measured or computed. Even if estimates of rainfall rates can be produced with higher accuracy through calibration techniques, it is still important to be able to determine and present the full range of possible precipitation values. For example, if it is known that a river will flood if it receives over an inch of rain, then an estimate of 0.9 inches of rain may lead hydrologists to the false conclusion that the river will not flood. On the other hand, a probabilistic estimate that includes the possible range of precipitation values with corresponding likelihoods would allow a hydrologist to determine the probability that the river will flood.

Additionally, the amount of rainfall a crop has received is extremely important in modeling the growth of a crop. The amount of water a field receives not only affects the availability of water to the crop, but the availability of other elements, such as nitrogen and potassium, to the crop. As a crop's growth can be widely dependent on the availability of water and other chemicals, variances in the amount of rainfall received by a field can lead to variances in a model of the growth of a crop. If these variances are not understood and presented to a farmer, the farmer may not be able to make informed decisions with respect to the crop.

SUMMARY OF THE DISCLOSURE

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

DETAILED DESCRIPTION

Figure 1:
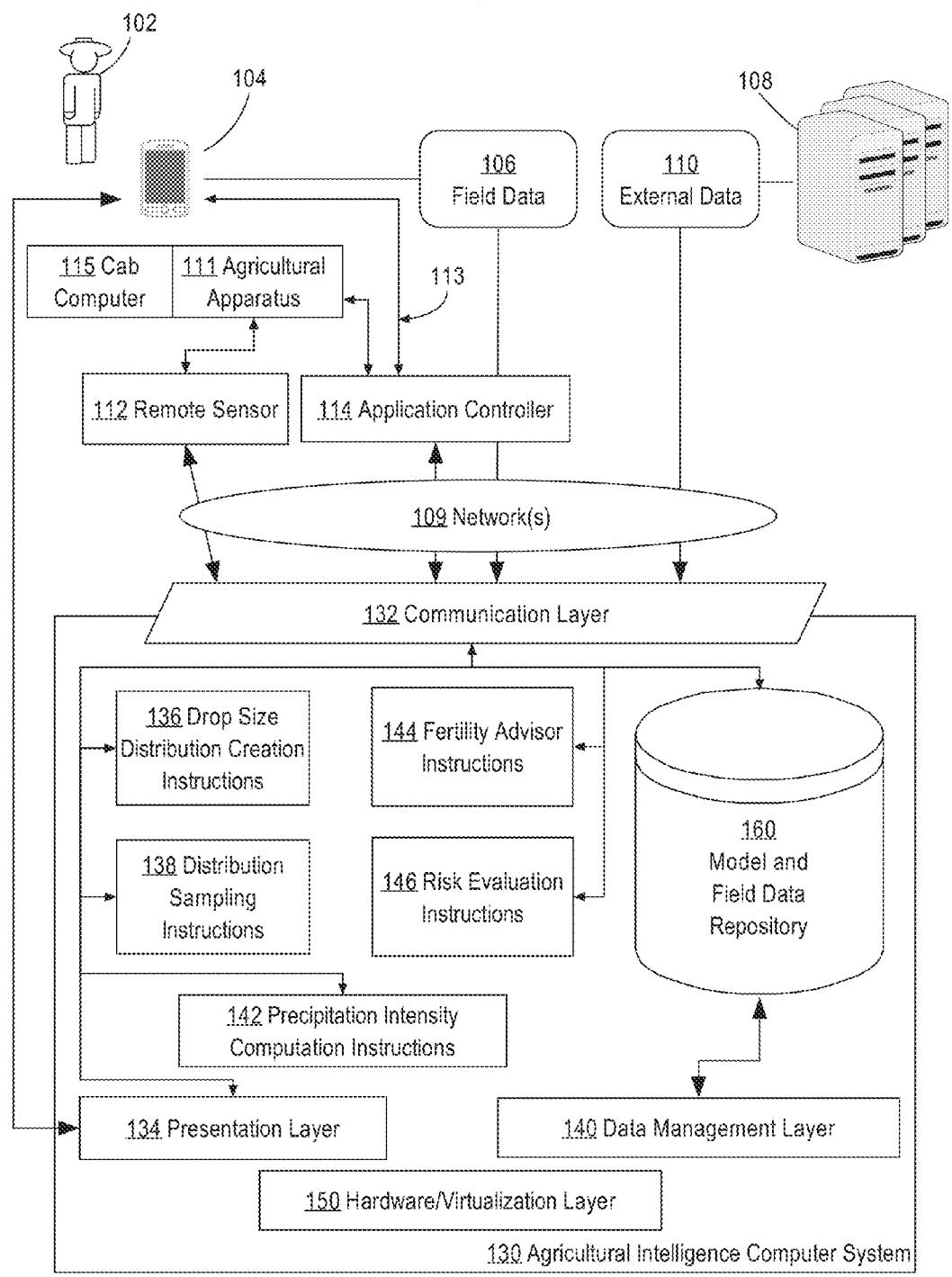
FIG. 1 illustrates an example computer system that is configured to perform the functions described herein, shown in a field environment with other apparatuses with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

1. GENERAL OVERVIEW
2. EXAMPLE AGRICULTURAL INTELLIGENCE COMPUTER SYSTEM
  2.1. STRUCTURAL OVERVIEW
  2.2. APPLICATION PROGRAM OVERVIEW
  2.3. DATA INGEST TO THE COMPUTER SYSTEM
  2.4. PROCESS OVERVIEW-AGRONOMIC MODEL TRAINING
  2.5. IMPLEMENTATION EXAMPLE-HARDWARE OVERVIEW
3. ERROR ESTIMATION
  3.1. RECEIVING RADAR DATA
  3.2. CREATING A DROP SIZE DISTRIBUTION
  3.3. PROBABILISTIC DISTRIBUTION OF RAINFALL INTENSITIES
  3.4. SPATIAL MODELING
  3.5. SPATIO-TEMPORAL MODELS
4. ERROR ESTIMATE USAGE
  4.1. DISPLAYING PRECIPITATION DISTRIBUTIONS
  4.2. IDENTIFYING THE RISK OF RARE EVENTS
  4.3. AGRONOMIC MODELS
5. BENEFITS OF CERTAIN EMBODIMENTS
6. EXTENSIONS AND ALTERNATIVES
7. ADDITIONAL DISCLOSURE

GENERAL OVERVIEW

Aspects of the disclosure generally relate to computer-implemented techniques for generating a probabilistic estimate of precipitation intensity from radar reflectivity data. In an embodiment, an agricultural intelligence computer system receives radar reflectivity data from one or more external servers. Based on the radar reflectivity data, the agricultural intelligence computer system uses statistical modeling techniques to create a distribution of drop sizes that could have led to the reflectivity measurements in the received radar reflectivity data. The agricultural intelligence computer system uses statistical sampling techniques to sample drop sizes from the drop size distribution. Using the sampled drop sizes and the radar reflectivity data, the agricultural intelligence computer system computes a plurality of rainfall rates. The agricultural intelligence computer system uses the plurality of rainfall rates to construct a probability distribution of precipitation intensities.

In an embodiment, a method comprises using a digital weather computing system, receiving over a network at the digital weather computing system comprising one or more processors and digital memory, electronic digital data comprising a plurality of values representing radar reflectivity measurements at a particular location during a particular period of time; using digitally programmed drop size distribution creation instructions in the digital weather computing system, creating a probabilistic distribution of rainfall drop sizes; using digitally programmed distribution sampling instructions in the digital weather computing system, sampling a plurality of drop size values from the probabilistic distribution of rainfall drop sizes; using digitally programmed precipitation intensity computation instructions in the digital weather computing system, computing a plurality of rainfall rates by, for each drop size value of the plurality of drop size values, computing a corresponding rainfall rate using the drop size value and one or more reflectivity values of the plurality of reflectivity values representing radar reflectivity measurements at the particular location during the particular period of time; and using digitally programmed fertility advisor instructions in the digital weather computing system, computing and displaying a probability distribution of precipitation intensities from the plurality of rainfall rates for the particular location.

Other features and aspect of the disclosure will become apparent in the drawings, description, and claims.

Structural Overview

2. EXAMPLE AGRICULTURAL INTELLIGENCE COMPUTER SYSTEM

2.1 Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields. The field manager computing device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source), (f) pesticide data (for example, pesticide, herbicide, fungicide, other substance or mixture of substances intended for use as a plant regulator, defoliant, or desiccant), (g) irrigation data (for example, application date, amount, source), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An external data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is an example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user 102 may be prompted via one or more user interfaces on the user device (served by the agricultural intelligence computer system) to input such information. In an example embodiment, the user 102 may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user 102 may specify identification data by accessing field identification data (provided as shape files or in a similar format) from the U.S. Department of Agriculture Farm Service Agency or other source via the user device and providing such field identification data to the agricultural intelligence computer system.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Drop size distribution creation instructions 136 comprise computer readable instructions which, when executed by one or more processors, causes agricultural intelligence computer system 130 to perform translation of radar reflectivity measurements and generation of a drop size distribution. Distribution sampling instructions 138 comprise computer readable instructions which, when executed by one or more processors, causes agricultural intelligence computer system 130 to perform statistical sampling techniques in order to sample a plurality of values from the drop size distribution. Precipitation intensity computation instructions 142 comprise computer readable instructions which, when executed by one or more processors, causes agricultural intelligence computer system 130 to perform computation of precipitation intensities from drop size values and radar reflectivity measurements. Fertility instructions 144 comprise computer readable instructions which, when executed by one or more processors, causes agricultural intelligence computer system 130 to create a digital agronomic model of one or more crops on one or more fields. Risk evaluation instructions 146 comprise computer readable instructions which, when executed by one or more processors, causes agricultural intelligence computer system 130 to perform computation of risk probabilities using a plurality of computed rainfall rates.

Figure 4:
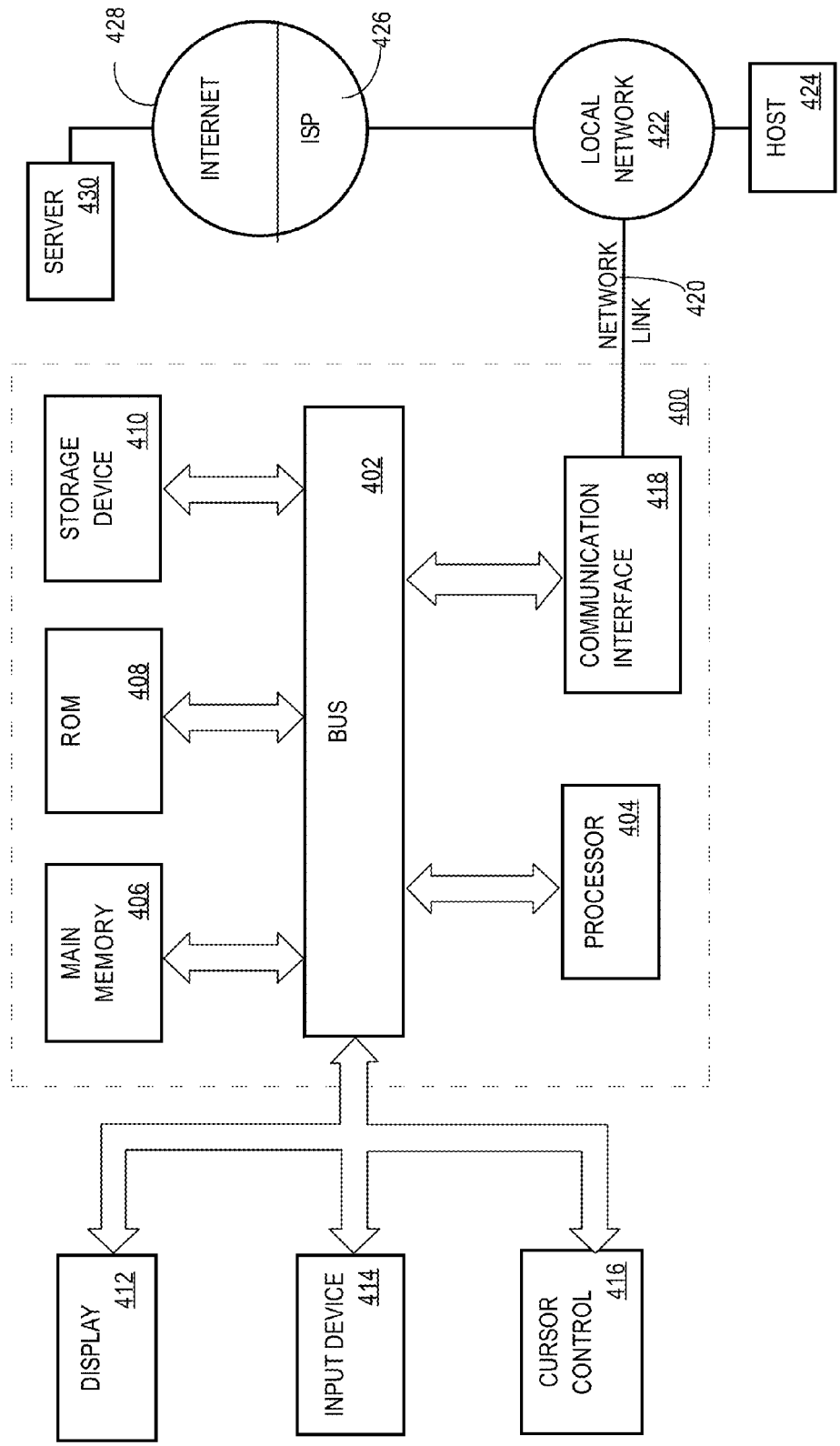
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system 130 independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide server-side functionality, via the network 109 to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, external APIs that push data to the mobile application, or instructions that call APIs of external systems to pull data into the mobile application.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 and programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, nitrogen instructions 210 are programmed to provide tools to inform nitrogen decisions by visualizing the availability of nitrogen to crops and to create variable rate (VR) fertility scripts. This enables growers to maximize yield or return on investment through optimized nitrogen application during the season. Example programmed functions include displaying images such as SSURGO images to enable drawing of application zones; upload of existing grower-defined zones; providing an application graph to enable tuning nitrogen applications across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of manure application that were used. Nitrogen instructions 210 also may be programmed to generate and cause displaying a nitrogen graph, once a program is applied to a field, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the NITROGEN ADVISOR, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 12 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers, hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors: component operating criteria sensors such as planting depth sensors, downforce cylinder pressure sensors, seed disc speed sensors, seed drive motor encoders, seed conveyor system speed sensors, or vacuum level sensors: or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame: planting depth controllers, such as linear actuators: metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like: or position actuators, such as for boom height, subsoiler depth, or boom position.

In an embodiment, examples of sensors 12 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors: grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
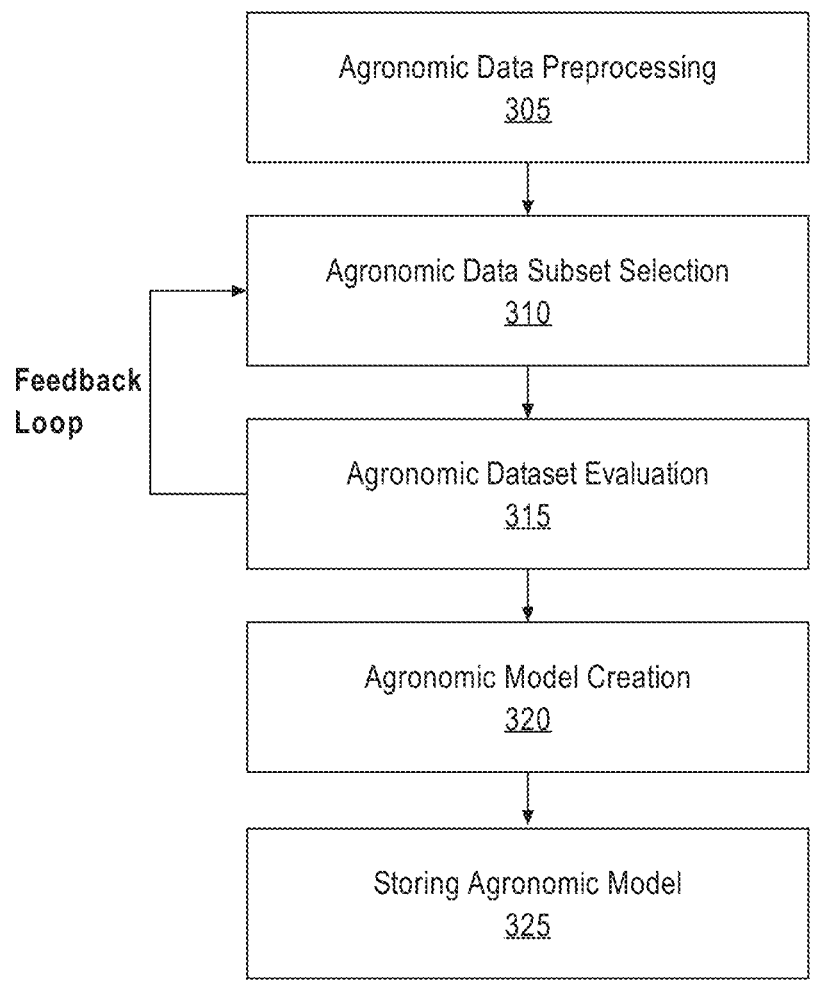
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more external data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more external data resources. The field data received from one or more external data resources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. ERROR ESTIMATION

In one embodiment, a data processing method comprises receiving a plurality of values representing radar reflectivity measurements at a particular location during a particular period of time; creating a probabilistic distribution of rainfall drop sizes; sampling a plurality of drop size values from the probabilistic distribution of rainfall drop sizes; computing a plurality of rainfall rates by, for each drop size value of the plurality of drop size values, computing a corresponding rainfall rate using the drop size value and one or more reflectivity values of the plurality of reflectivity values representing radar reflectivity measurements at the particular location during the particular period of time; computing and displaying a probability distribution of precipitation intensities from the plurality of rainfall rates for the particular location. More specific implementations, embodiments and examples of this inventive concept are now described.

3.1. Receiving Radar Data

Figure 5:
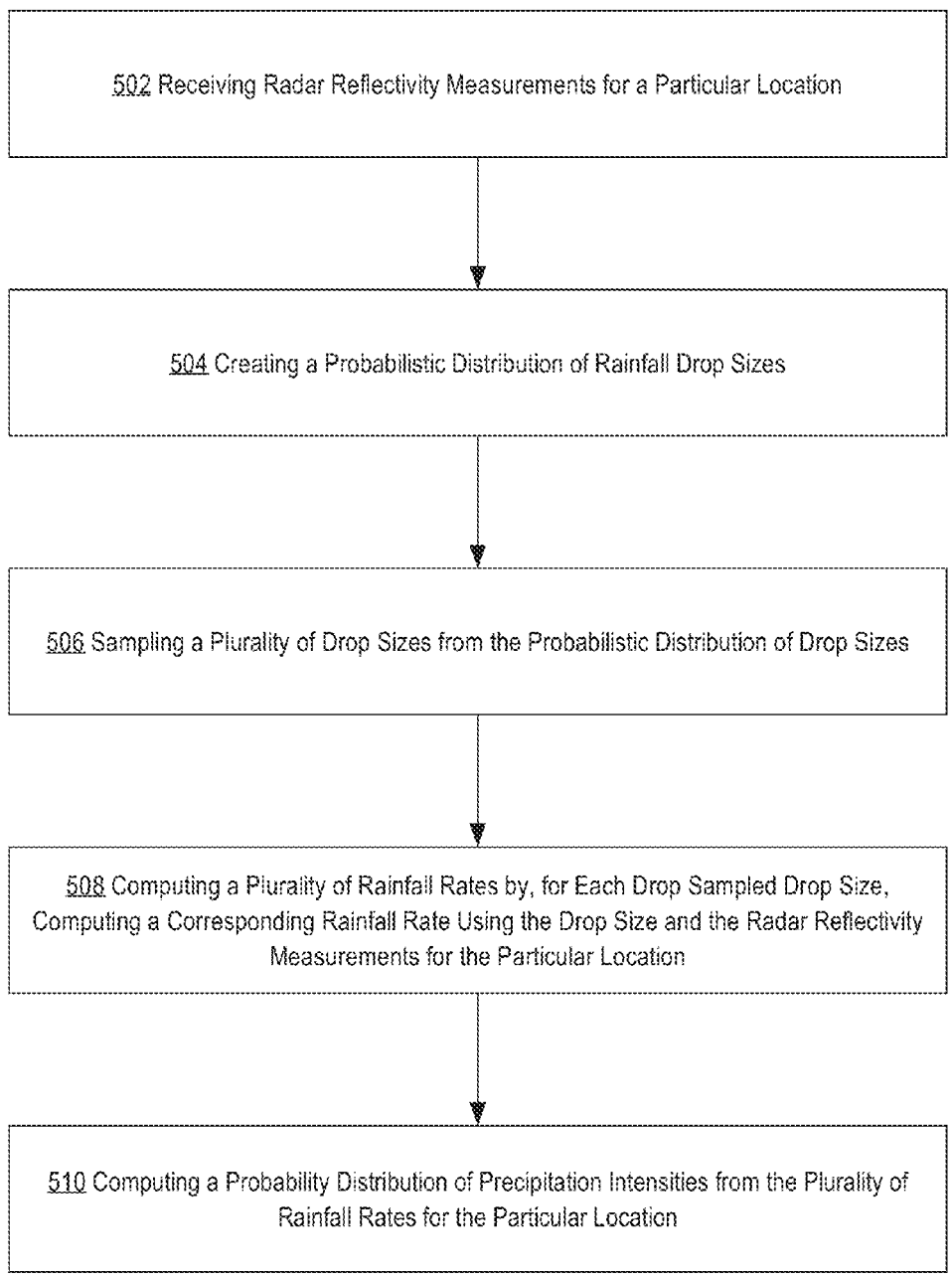
FIG. 5 is a flow diagram that depicts an example method for computing a probabilistic estimate of precipitation intensity based on radar reflectivity data.

FIG. 5 is a flow diagram that depicts an example method for computing a probabilistic estimate of precipitation intensity based on radar reflectivity data.

At step 502, radar reflectivity measurements are received for a particular location. For example, agricultural intelligence computer system 130 may receive polarimetric radar measurements from external data server computer 108. In an embodiment, external data server computer 108 comprises one or more radar server computers that are communicatively coupled to a radar device which emits a polarized beam towards the particular location and receives scattered energy. In some embodiments, agricultural intelligence computer system 130 receives reflectivity data, comprising a location of the radar device, an amount of energy emitted from the radar device, a direction of the energy emission, an amount of time between the emission and the receipt of the scattered energy, and an amount of scattered energy received. From the reflectivity data, agricultural intelligence computer system 130 may compute the location of the precipitation and the magnitude of the precipitation. In other embodiments, one or more initial computations may be performed in advance, such as by the one or more radar server computers, and agricultural intelligence computer system may receive location and/or precipitation magnitude estimates from the one or more radar server computers. For example, agricultural intelligence computer system 130 may send a request to the one or more radar server computers for radar measurements or precipitation estimates at the particular location. The one or more radar computer servers may compute the location of precipitation for each reflectivity measurement and identify energy measurements that are associated with the particular location. The one or more radar computer servers may send the reflectivity measurements associated with the particular location to agricultural intelligence computer system 130.

Agricultural intelligence computer system 130 may be programmed or configured to receive radar data from multiple different sources. Agricultural intelligence computer system 130 may use the radar data received from different sources to strengthen the computation of precipitation distributions. For example, agricultural intelligence computer system 130 may receive polarimetric radar measurements from multiple different radar devices at different locations. Agricultural intelligence computer system 130 may use the multiple measurements to correct for errors in the polarimetric radar measurements caused by outside sources, such as noise, atmospheric conditions, or physical barriers between radar devices and the particular location. Additionally and/or alternatively, agricultural intelligence computer system 130 may model a precipitation distribution for each different radar device.

3.2. Creating a Drop Size Distribution

At step 504, a probabilistic distribution of rainfall drop sizes is created. Agricultural intelligence computer system 130 may construct a drop size distribution, a probabilistic distribution which describes the probabilities that the precipitation at a particular location comprises various ranges of drop sizes. For example, a particular drop size distribution may indicate a thirty percent chance that the average diameter of the drops in the precipitation at a particular location is between two and three millimeters. Agricultural intelligence computer system 130 may generate the drop size distribution to be consistent with the reflectivity measurements. Creating a distribution that is consistent with reflectivity measurements may comprise creating a probabilistic model for each set of reflectivity measurements where the distribution identifies each drop size that could have led to the observed reflectivity measurements with corresponding probabilities that the precipitation comprised each drop size. For example, a particular radar reflectivity measurement may be more likely to have occurred if the drop sizes at the particular location are 3 mm than if the drop sizes at the particular location are 5 mm. Thus, the drop size distribution may contain a higher probability around a diameter of 3 mm than around the diameter of 5 mm.

In an embodiment, agricultural intelligence computer system 130 utilizes a distribution free parameterization to identify probabilities. For example, agricultural intelligence computer system 130 may compare disdrometer data describing measurements of precipitation drops to reflectivity measurements to identify the range of probable drop sizes for each reflectivity measurement. Based on the various drop sizes measured by the disdrometers and the corresponding reflectivity measurements, agricultural intelligence computer system 130 may create and store a range of probable drop sizes for each reflectivity measurement. By utilizing a distribution free parameterization, agricultural intelligence computer system 130 creates more accurate estimates of the probabilities of various drop sizes where the probabilities of drop sizes do not conform to a particular type of distribution.

Additionally and/or alternatively, agricultural intelligence computer system 130 may assume that the probability of drop sizes fits a particular type of distribution, such as a gamma distribution, and construct a drop size distribution as the particular type of distribution fit to the reflectivity data. By assuming a particular type of distribution and fitting the data into the particular type of distribution, agricultural intelligence computer system 130 creates a computationally inexpensive method of modeling the various drop sizes. For a gamma distributed drop size distribution, a distribution may be constructed such that the measured reflectivity can be expressed as a function of the distribution of drop sizes:

$$Z = CN_v \frac{\Gamma(\alpha+6)}{\beta^6 \Gamma(\alpha)}$$

where Z is the reflectivity, $N_v$ is the estimated concentration of drop sizes of equivalent diameter, $\alpha$ is the shape of the gamma distribution, and f is the inverse scale of the gamma distribution.

In an embodiment, agricultural intelligence computer system 130 creates the drop size distribution by separately modeling the horizontal reflectivity from the vertical reflectivity. As raindrops are not perfectly spherical, but oblate spheroids, the horizontal and vertical cross sections of drops will differ, thereby leading to a horizontal reflectivity that differs from the vertical reflectivity. By separating the reflectivity measurements into horizontal reflectivity and vertical reflectivity, agricultural intelligence computer system 130 can create a drop size distribution that describes the probability of each drop size based on two separate measures of reflectivity, thereby constricting the range of the drop size distribution to one which is separately consistent with both measures of reflectivity.

3.3. Probabilistic Distribution of Rainfall Intensities

At step 506 a plurality of drop sizes are sampled from the probability distribution of rainfall drop sizes. In embodiments that utilize a distribution free parameterization, drop sizes may be sampled from the distribution free parameterization based on corresponding probabilities of the various drop sizes. Agricultural intelligence computer system 130 may execute sampling software or algorithms to sample a plurality of values for the drop sizes of precipitation at the particular location from the drop size distribution. For example, agricultural intelligence computer system 130 may execute a Markov chain Monte Carlo algorithm, such as Gibbs sampling, to sample values from the drop size distribution.

At step 508, a plurality of rainfall rates is computed by computing a rainfall rate for each drop size of the plurality of drop sizes. Agricultural intelligence computer system 130 may use the values for drop sizes sampled from the above equation to create a plurality of estimates of rainfall. For example, agricultural intelligence computer system 130 may model the rainfall rate as a function of the drop size distribution. In an embodiment, a model of the rainfall rate as a function of the drop size distribution comprises $$R = \frac{6\pi}{10^4} \frac{N_V \Gamma(\alpha+3)}{\Gamma(\alpha)} \left( \frac{v_{max}}{\beta^3} - \frac{v_a \beta^\alpha}{(\beta+v_b)^{\alpha+3}} \right)$$

where $v_{max}$, $v_a$, and $v_b$ are constants relating to the terminal velocity of drops of a particular diameter, v(D), that follow the form of $v(D)=v_{max}-v_a e^{v_b D}$. In an embodiment, $v_{max}$, $v_a$, and $v_b$ are parameterized using disdrometer data to relate the terminal velocity of rainfall with various drop sizes to the diameter of the drops.

At step 510, a probability distribution of precipitation intensities is computed from the plurality of rainfall rates. Agricultural intelligence computer system 130 may aggregate the plurality of rainfall estimates computed from the various drop sizes sampled from the drop size distribution. Agricultural intelligence computer system 130 may fit the plurality of rainfall estimates into a particular type of distributions, such as a gamma distribution or a normal distribution. Additionally and/or alternatively, agricultural intelligence computer system 130 may create a large number of calculations of rainfall rates, such as one thousand calculations, and make determinations about the probabilistic distribution from the calculations. For example, if three hundred of one thousand calculations show precipitation intensities above 2 mm, agricultural intelligence computer system 130 may estimate that there is a thirty percent chance that the actual precipitation intensity is above 2 mm.

To create hourly rainfall accumulation estimates, agricultural intelligence computer system 130 may generate a probability distribution of precipitation intensities at specific intervals and aggregate the distributions or precipitation intensities into an hourly distribution. For example, agricultural intelligence computer intelligence computer system 130 may create estimates of precipitation and estimates of the uncertainties in the precipitation every minute for an hour. Agricultural intelligence computer system 130 may then average the estimates and the intensities to obtain hourly accumulation. In an embodiment, agricultural intelligence computer system 130 reduces memory usage while maintaining high accuracy by dynamically altering the specific intervals based on received weather data. For example, if agricultural intelligence computer system 130 identifies relatively stable weather conditions, such as constant consistent rainfall estimates, agricultural intelligence computer system 130 may increase the length of the intervals so that less computations are performed over an hourly period. In contrast, if agricultural intelligence computer system identifies fluctuating weather conditions, agricultural intelligence computer system 130 may increase decrease the length of the intervals so that more computations are performed, thereby increasing the accuracy of the hourly precipitation estimates.

Figure 6:
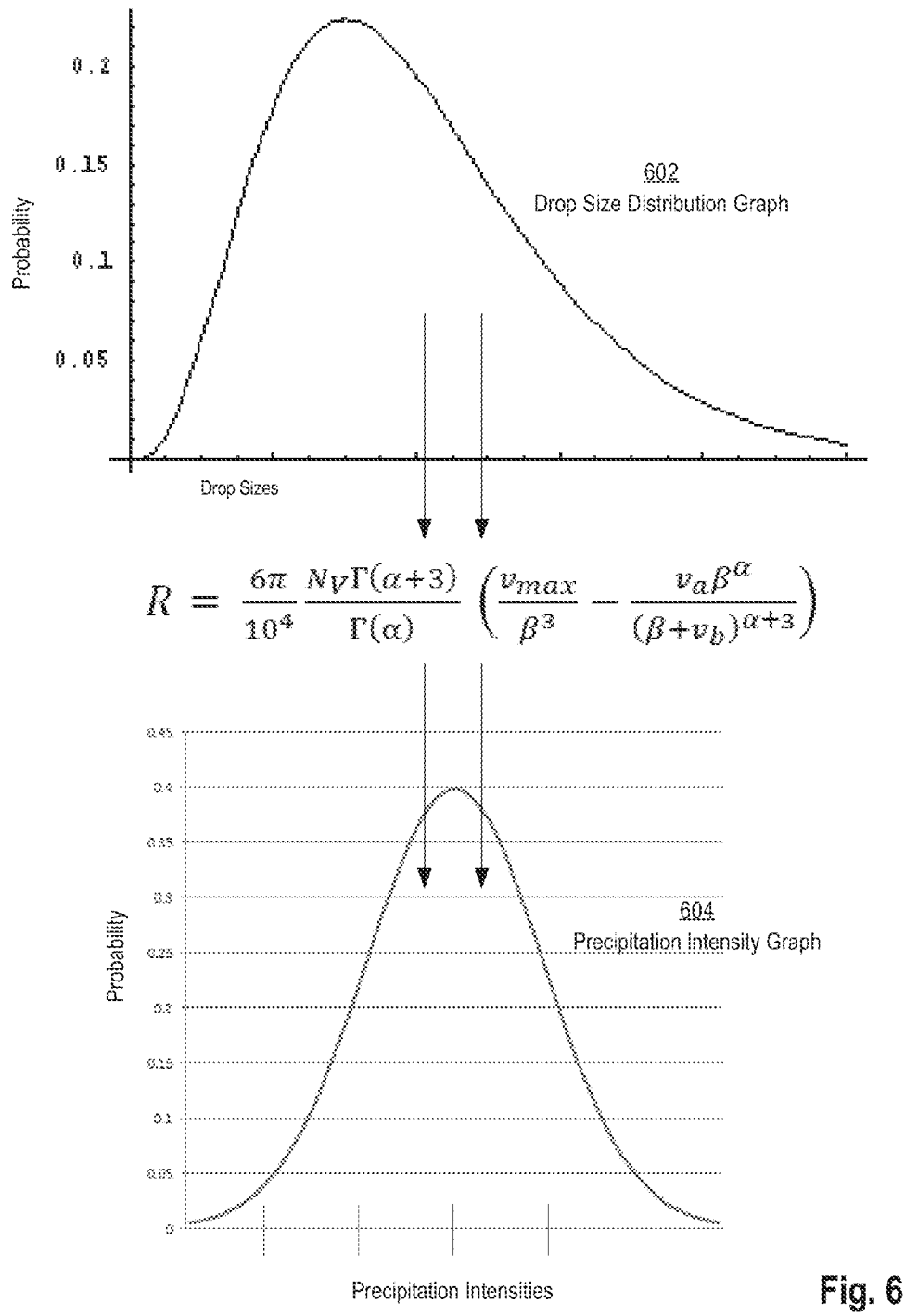
FIG. 6 depicts a method of sampling a drop rate distribution to compute a probabilistic estimate of precipitation intensity based on radar reflectivity.

FIG. 6 depicts a method of sampling a drop rate distribution to compute a probabilistic estimate of precipitation intensity based on radar reflectivity. Drop size distribution graph 602 represents a drop size distribution for one or more particular reflectivity measurements. Different values are sampled from drop size distribution graph 602 and fed into the rainfall rate equation. The outputs from the rainfall rate equation are then used to construct precipitation intensity graph 604 which represents a range of precipitation estimates that are consistent with the radar reflectivity data.

The above described modeling techniques may be implemented with purely liquid precipitation as well as with mixed phase precipitation. Mixed phase precipitation includes both liquid and solid precipitation. Agricultural intelligence computer system 130 may extend the model to cover a mixture of solid and liquid phases with a particular mixing parameter. The mixing parameter, which describes the percentage of precipitation that is liquid versus solid, may be inferred from data extracted from one or more numerical weather prediction analyses. Additionally and/or alternatively, the mixing parameter may be inferred from environmental variables and the vertical profile of reflectivity at the particular location. For example, based on temperature estimates for the particular location, agricultural intelligence computer system 130 may determine a probability that the precipitation is solid precipitation or liquid precipitation and generate the mixing parameter accordingly.

3.4. Spatial Modeling

In an embodiment, agricultural intelligence computer system 130 generates spatially correlated estimates of rainfall rates using reflectivity data corresponding to neighboring locations. While the concentration of drops may vary within a particular storm, the average hydrometeor drop size in a storm tends to be highly spatially correlated. Agricultural intelligence computer system 130 may create more precise estimates of the distribution of precipitation intensities using a spatially correlated drop size distribution. To create a spatially correlated drop size distribution or to model a spatially correlated estimation of rainfall rates, agricultural intelligence computer system 130 may initially receive radar reflectivity data for a wide range of locations. For example, a single radar scan may produce hundreds of thousands of polarimetric radar measurements spanning a particular physical location. For a particular scan, agricultural intelligence computer system may store data representing radar reflectivity data in each location. In an embodiment, radar reflectivity data for a particular location is correlated to radar reflectivity data for neighboring locations at the same altitude as the particular location.

For a particular location, agricultural intelligence computer system 130 may identify polarimetric radar measurements that are within a particular horizontal distance of the particular location. For example, agricultural intelligence computer system 130 may be configured to identify polarimetric radar measurements within a preset correlation length of each particular location. A correlation length refers to a distance within which two measurements or estimates of the same parameter are considered to be correlated. For example, a correlation length of 30 km may be set for the weighted mean diameter of the drop sizes, thereby indicating that the weighted mean diameter of the drop sizes at the particular location is correlated to the weighted mean diameters of the drop sizes at locations within 30 km from the particular location.

In an embodiment, agricultural intelligence computer system 130 uses a Gaussian process to impose constraints on the probability distribution of precipitation intensities. Specifically, a Gaussian process may be used to impose smoothness on a variable within a particular area. For a given variable x with noisy observations at a set of locations $s=\{s_0, \ldots, s_n\}$, a spatial correlation between locations may be modeled using a covariance function C(s, s') which defines the covariance of x at two locations, s and s'. For example, an exponential covariance function may be defined by $$C(s,s') = e^{-|s-s'|/l}$$

where |s−s'| is the distance between two locations and e is the correlation length. Agricultural intelligence computer system 130 may use the covariance function to condition the Gaussian function on the noisy observations and generate predictions of x(p) at un-observed locations $p=\{p_0, \ldots, p_n\}$. Using the covariance function, a distribution for a particular parameter may be constrained based on surrounding observations by $$x(p) = \mathcal{N}(C_{sp}^T(C_{ss}+\sigma^2(s))^{-1}\hat{x}(s), C_{pp}-C_{sp}^T(C_{ss}+\sigma^2(s))^{-1}C_{sp})$$

where $C_{sp}$ is the covariance matrix between locations s and locations p and $\sigma^2(s)$ is a diagonal matrix comprising variances in s along a diagonal.

In an embodiment, agricultural intelligence computer system 130 imposes spatial constraints directly on the rainfall rate. Agricultural intelligence computer system 130 may initially infer parameters of the drop size distribution. Agricultural intelligence computer system 130 may then use the techniques described herein to compute rainfall rates from the inferred parameters of the drop size distribution. A Gaussian process, such as the one described above, may be used to constrain the rainfall rates at the particular location based on the computed rainfall rates at the surrounding locations within the correlation length. For example, the Gaussian process described above may be used to infer rainfall rates at a particular location based on polarimetric radar measurements from surrounding locations. The distribution of rainfall rates created using the Gaussian process described above may then be used to impose constraints on estimates of rainfall rates created using reflectivity data at the particular location.

In an embodiment, agricultural intelligence computer system 130 imposes constraints directly on the parameters of the drop size distribution. Parameters of the drop size distribution may include the relative volume, or volume of liquid water per volume of atmosphere, V, the mass weighted mean diameter, $D_m$, and the mass weighted standard deviation of the diameter am. The parameters for the drop size distribution may be initially decorrelated so that separate Gaussian functions may be constructed for each variable independently. For example, a logarithmic transformation may be applied to each variable and fit to a Gaussian function as $$\log(D_m) = GP(0, C(s,s';l_D))$$

$$\log(\sigma_m) = GP(0, C(s,s';l_\sigma))$$

$$\log(V) = GP(0, C(s,s';l_V)).$$

Agricultural intelligence computer system 130 may assign one or more correlation lengths to the Gaussian functions, depending on the parameter. For example, a correlation length of 30 kilometers may be set for the mass weighted mean diameter and a correlation length of 1 kilometer may be set for the mass weighted standard deviation of the diameter and the relative volume.

3.5. Spatio-Temporal Models

In an embodiment, agricultural intelligence computer system 130 creates temporally correlated estimates of rainfall rates using reflectivity data corresponding to the particular location at neighboring times. Agricultural intelligence computer system 130 may constrain the estimates of rainfall rates or the parameters of the drop size distribution using radar reflectivity data at different times within a temporal correlation length. In an embodiment, agricultural intelligence computer system 130 creates spatio-temporally correlated estimates of rainfall rates using reflectivity data corresponding to neighboring locations and neighboring times. For example, the covariance function described above may be modified to include different times within a temporal correlation length, $\lambda$, as follows:

$$C((s,t)(s',t'))=C(s,s')e^{|t-t'|/\lambda}.$$

A temporal correlation length of a half hour may be set of the rainfall rate and/or the parameters of the drop size distribution. Using the spatio-temporal covariance function and the Gaussain function described above, agricultural intelligence computer system 130 may infer rainfall rates and/or parameters of the drop size distribution and constrain the distribution of rainfall rates based on the inferred values.

In an embodiment, the accuracy of the spatio-temporal model is further increased by incorporating the advection of the storm. Agricultural intelligence computer system 130 may generate an initial estimate of a velocity, v, of a particular storm over the particular location. As the storm moves, agricultural intelligence computer system 130 may create an advection model that correlates the rainfall rate and/or the parameters of the drop size distribution to the moving reference frame of the storm. Thus, at a particular time t, a location s may correlate to an initial position s by $s'=s-vt$. In an embodiment, agricultural intelligence computer system parameterizes the position of each location using latitude and longitude. To incorporate the movement of the storm, agricultural intelligence computer system 130 may separate the velocity of the storm into a longitudinal component u and a latitudinal component v. Thus, a new location for each point, $s=(s_{ton}, s_{lat})$, may be defined as $\alpha(s, t; u, v)=(s_{ton}-ut, s_{lat}-vt)$. Agricultural intelligence computer system 130 may utilize a spatio-temporal covariance function that factors in the movement of the storm, such as $$C((s,t)(s',t');l,\lambda,u,v)=e^{|\alpha(s,t;u,v)-\alpha(s',t';u,v)|/l}e^{|t-t'|/\lambda}.$$

Agricultural intelligence computer system 130 may use the spatio-temporal covariance function that factors in the movement of the storm as described above in a Gaussain process to constrain the rainfall rates and/or parameters of the drop size distribution in a manner that factors in the correlation between rainfall rates in surrounding locations, the correlation between rainfall rates at surrounding times, and the moving reference frame of the storm. Additionally and/or alternatively, agricultural intelligence computer system 130 may use the techniques described herein to model movement and changes in a particular volume of hydrometeors. As described above, an initial reference point in the storm at time t may be described by a horizontal movement of the storm, $s'_{hor}=s_{hor}-v_{hor}t$. A position of a particular volume of hydrometeors may be described by a similar equation which factors in the vertical movement of the drops, $s'=(s'_{hor}, s'_{ver})=(s_{hor}-v_{hor}t, s_{ver}-v_{vert})$, where $v_{hor}$ is the estimated velocity of the storm and ver is the terminal velocity of raindrops in the storm. Based on reflectivity data corresponding to hydrometeors at a first position and time, agricultural intelligence computer system 130 may constrain estimates of rainfall rates and/or parameters of a drop size distribution created by reflectivity data corresponding to the same hydrometeors at a second position and time. For example, if independent drop size distributions created at both positions and times contain overlapping values and differing values, agricultural intelligence computers system 130 may retain the overlapping values and discard the differing values. Agricultural intelligence computer system 130 may further increase the accuracy of estimates of rainfall rates by increasing the number of reflectivity measurements of a particular volume of hydrometeors corresponding to different positions and times that are used to constrain the estimates of rainfall rates and/or parameters of the drop size distribution.

In an embodiment, agricultural intelligence computer system 130 may create a model that describes evaporation, collision, and breakup of drops based, in part, on data describing environmental factors, such as temperature and dew point. Using the model that describes evaporation, collision, and breakup of drops, agricultural intelligence computer system 130 may model probable changes in the parameters of the drop size distribution between a first point and a second point. Agricultural intelligence computer system 130 may further constrain the parameters of the drop size distribution to be consistent with the reflectivity measurements at the a first point, probable changes to the parameters between the first point and the second point, and reflectivity measurements at the second point.

4. ERROR ESTIMATE USAGE

4.1. Displaying Precipitation Distributions

In an embodiment, a range of probable precipitation intensities is displayed. Displaying the range of probable precipitation intensities may include displaying an estimated value for the precipitation intensity along with the range of probable precipitation intensities. The estimated value for the precipitation value may comprise the mean value of the probability distribution of precipitation intensities while the range of probable precipitation intensities may comprise a range that includes all values within two standard deviations of the mean value of the probability distribution of precipitation intensities. Agricultural intelligence computer system 130 may display the precipitation estimate and the range of probable precipitation intensities through presentation layer 134 on field manager computing device 104.

Figure 7:
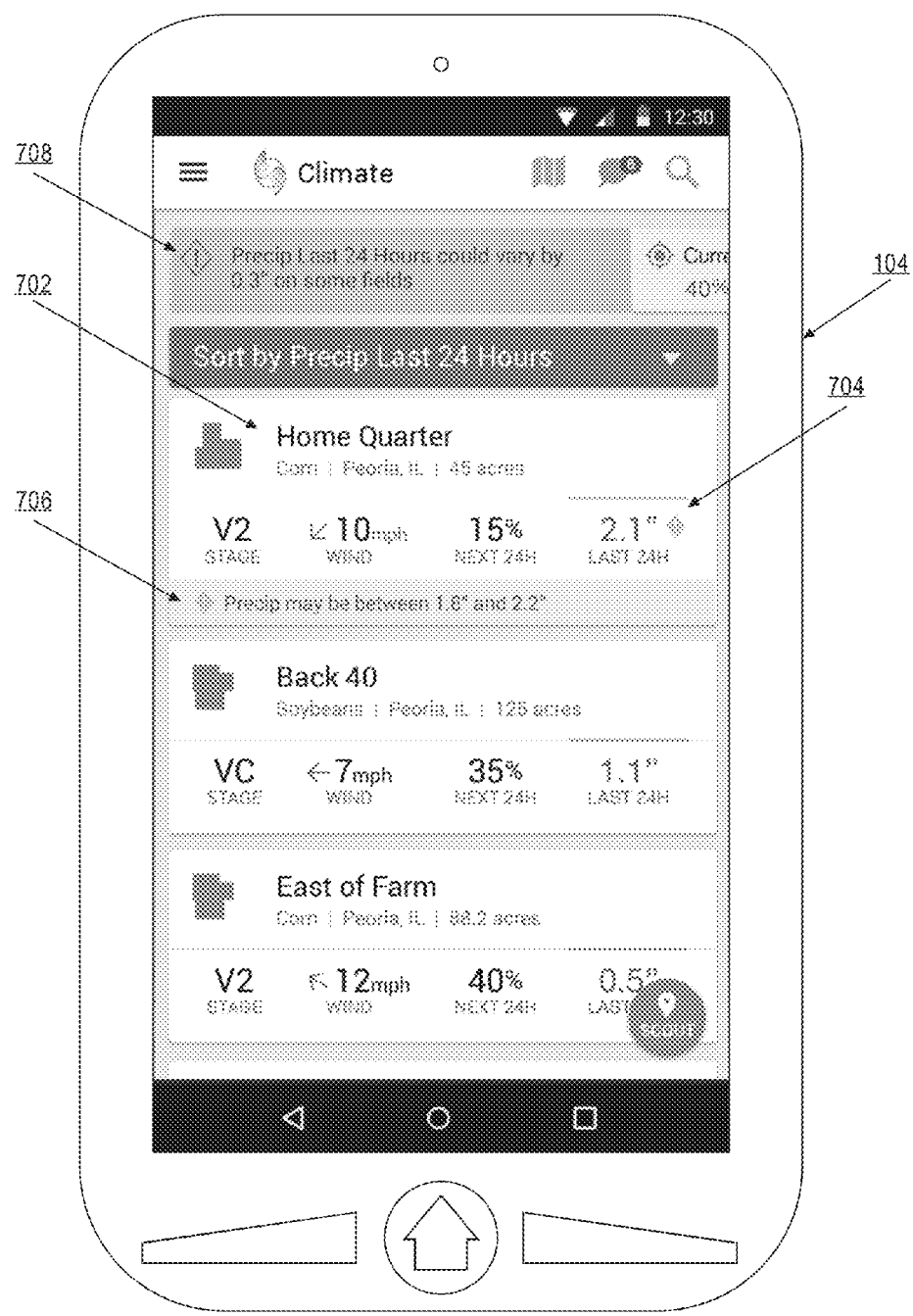
FIG. 7 depicts a graphical user interface displaying precipitation estimates with possible errors for one or more fields on a client computing device.

FIG. 7 depicts a graphical user interface displaying precipitation estimates with possible errors for one or more fields on a client computing device. Field manager computing device 104 contains a graphical user interface with field identification 702, precipitation estimate 704, probable precipitation range 706, and uncertainty warning 708. Field identification 702 identifies one or more fields associated with user 102 of field manager computing device 104. For example, user 102 may be a farmer that wishes to track an amount of water received by one or more crops on one or more fields. The farmer may identify the one or more fields to agricultural intelligence computer system 130 and agricultural intelligence computer system 130 may send precipitation estimates at the one or more fields to the farmer.

Precipitation estimate 704 identifies the estimated precipitation value for a particular period of time. Precipitation estimate 704 may correspond to a mean value of the probability distribution computed by agricultural intelligence computer system 130 using radar reflectivity data relating to the one or more fields. Probable precipitation range 606 depicts a range of values in which agricultural intelligence computer system 130 has determined the actual precipitation for the one or more fields lies. For example, probable precipitation range 606 may be a range of values within two standard deviations of the mean. Additionally and/or alternatively, the range of values may comprise a range computed to include the middle ninety percent of values computed for the probability distribution of precipitation intensities. For example, in FIG. 7, the precipitation estimate is 2.1" and probable precipitation range is a range of values between 1.8" and 2.2". Uncertainty warning 708 identifies a variance of precipitation for one or more of the fields. By indicating a variance that applies to one or more of the fields, agricultural intelligence computer system 130 notifies user 102 that the precipitation estimates may not be completely accurate, thereby allowing user 102 to make more informed decisions regarding management of the crops on the one or more fields.

4.2. Identifying the Risk of Rare Events

In an embodiment, agricultural intelligence computer system 130 uses the probability distribution of precipitation estimates to identify the risk of a rare event occurring. Agricultural intelligence computer system 130 may receive a request to monitor one or more locations for occurrence of a rare event or to identify the probability that a rare event occurred where occurrence of the rare event is conditional, at least in part, on a particular intensity of precipitation. For example, agricultural intelligence computer system 130 may receive a request to monitor a particular river to determine if the river will flood. Agricultural intelligence computer system 130 may also receive data indicating that the river will flood if it receives over three inches of precipitation. To identify the risk of the rare event occurring, agricultural intelligence computer system 130 may identify a probability that the particular intensity of precipitation occurred.

Figure 8:
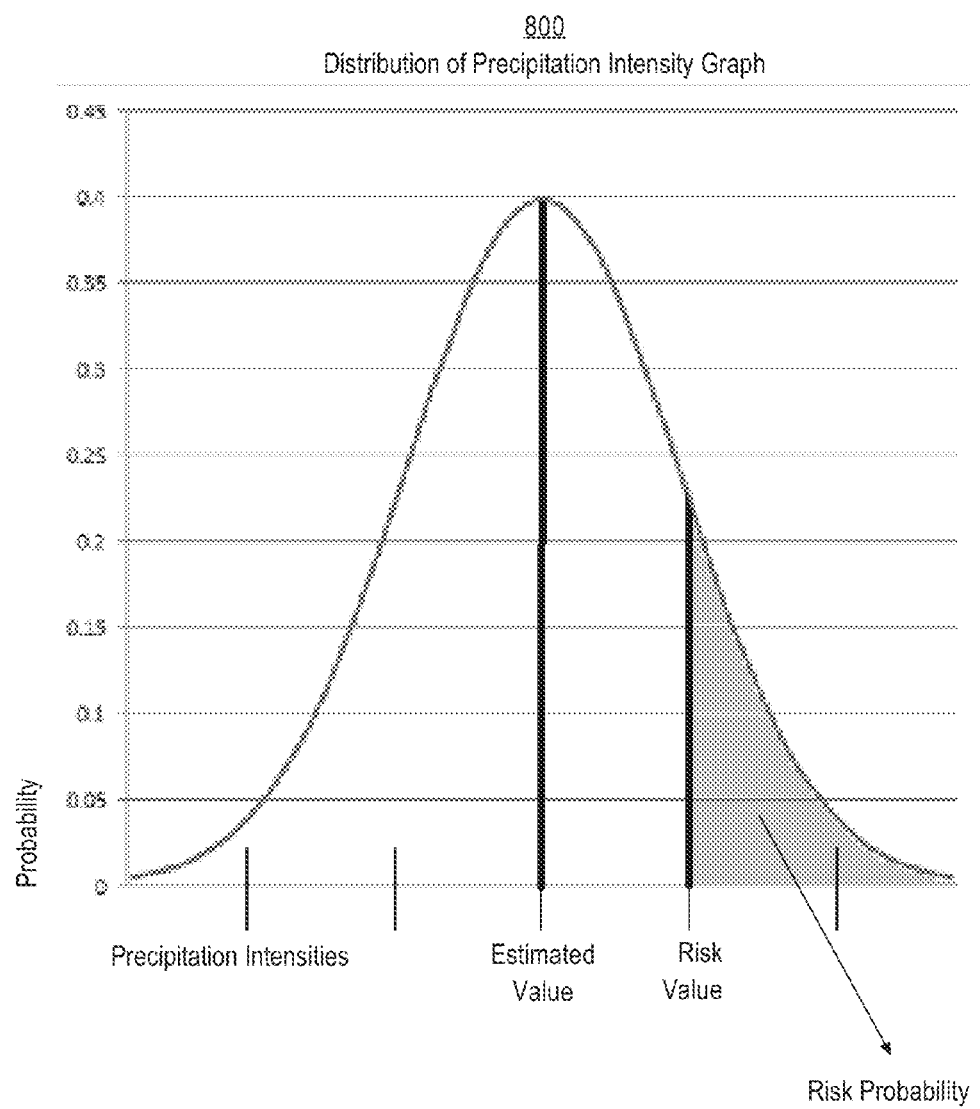
FIG. 8 depicts a method of identifying a risk of a rare event using a probabilistic estimate of precipitation intensity.

FIG. 8 depicts a method of identifying a risk of a rare event using a probabilistic estimate of precipitation intensity. In an embodiment, agricultural intelligence computer system 130 generates distribution of precipitation intensity graph 800 describing the probable precipitation intensities at a particular location for a particular period of time. Distribution of precipitation intensity graph 800 contains an estimated value at the peak of the distribution and a risk value indicating the particular intensity of precipitation upon which the occurrence of the rare event is conditional. Agricultural intelligence computer system 130 may identify the risk of occurrence of the rare event by computing the area under the curve depicted in distribution of precipitation intensity graph 800 above the risk value. As an example, if the estimated value of precipitation is 2.1" and the risk value is 2.4", an initial estimate of the precipitation intensity may lead to the false assumption that the rare event would not occur. Under the method depicted in FIG. 8, agricultural intelligence computer system 130 may determine that, while the estimated value of precipitation is 2.1", there is a 30% probability that the actual precipitation is 2.4" or above. Thus, agricultural intelligence computer system 130 may identify a 30% probability of the rare event occurring.

4.3. Agronomic Models

In an embodiment, agricultural intelligence computer system 130 uses precipitation estimates and uncertainties in the precipitation estimates to create an agronomic model. In an embodiment, an agronomic model is a data structure in memory of agricultural intelligence computer system 130 that contains location and crop information for one or more fields. An agronomic model may also contain agronomic factors which describe conditions which may affect the growth of one or more crops on a field. Additionally, an agronomic model may contain recommendations based on agronomic factors such as crop recommendations, watering recommendations, planting recommendations, and harvesting recommendations. The agronomic factors may also be used to estimate one or more crop related results, such as agronomic yield. The agronomic yield of a crop is an estimate of quantity of the crop that is produced.

In an embodiment, agricultural intelligence computer system 130 uses the precipitation estimates to create an agronomic model in memory or in persistent storage in response to a request from field manager computing device 104 for an agronomic model. In other embodiments, agricultural intelligence computer system 130 receives a request from a third party for an agronomic model. For example, an insurance company may request an agronomic model for an insured customer's field to determine the risks associated with the crop planted by the customer. In another example, an application server may send a request to agricultural intelligence computer system 130 to create an agronomic model for a specific user's field. Alternatively, agricultural intelligence computer system 130 may generate agronomic models periodically for particular supervised fields. Agricultural intelligence computer system 130 may also generate agronomic models in response to obtaining updated precipitation estimates.

Agricultural intelligence computer system 130 may create an agronomic model which identifies one or more effects of received precipitation on the crops of a field. The amount of water a crop receives may affect the development cycle of the crop. Agricultural intelligence computer system 130 may estimate the amount of water a crop needs and determine the likely amount of water the crop will receive from natural precipitation based on the precipitation estimates. Agricultural intelligence computer system 130 may use this information to affect the estimate for agronomic yield. Additionally, agricultural intelligence computer system 130 may use the precipitation estimates to generate recommendations for farmers. For example, agricultural intelligence computer system 130 may recommend that a crop is not watered on a day that has a high probability of large amounts of precipitation. Alternatively, agricultural intelligence computer system 130 may recommend that a crop receives extra water for periods of time when precipitation has been estimated to be low.

In an embodiment, uncertainties in the estimates are propagated into the agronomic models. For example, agricultural intelligence computer system 130 may determine that a particular crop requires 2.1" of precipitation on a particular day before the crop is adversely affected by the lack of water. If agricultural intelligence computer system 130 obtains an estimate of 2.2" of precipitation on the particular day, agricultural intelligence computer system 130 may identify the probability that the actual precipitation is lower than 2.1" and create a probability that the crop is adversely affected by the lack of water based on the probability that the actual precipitation is lower than 2.1". In an embodiment, agricultural intelligence computer system 130 identifies overall effects on agronomic values based on uncertainties in the precipitation. For example, agricultural intelligence computer system 130 may identify a different agronomic yield for a crop when the crop receives less than 2.1" of precipitation. Thus, using the techniques described herein, agricultural intelligence computer system 130 may generate a probabilistic distribution of the agronomic yield of the crop based, at least in part, on uncertainties in the precipitation received by the crop.

Uncertainties in the estimates of precipitation estimates may also be propagated into other models that have a dependence on water content in the one or more fields. For example, the moisture content of a field may affect a crop's ability to access one or more agrochemicals, such as nitrogen, in the field. Additionally, the moisture content of a field may affect the loss of agrochemicals through processes such as leaching. Thus, while the precipitation estimates may be used to model the effects of precipitation on the other models, agricultural intelligence computer system 130 may also model the effects on the other models of different levels of precipitation that are consistent with the estimated uncertainties. For example, if precipitation above a particular level would increase the loss of nitrogen by ten percent, agricultural intelligence computer system 130 may identify the probability that the actual precipitation intensity is above the particular level as a probability of an increase in the loss of nitrogen by ten percent.

5. BENEFITS OF CERTAIN EMBODIMENTS

Using the techniques described herein, a computer can deliver probabilistic precipitation data that would be otherwise unavailable. For example, the techniques herein can determine, for a particular radar based precipitation estimate, a range of precipitation values that encompasses the actual amount of precipitation received by one or more fields. The performance of the agricultural intelligence computing system is improved using the drop size distribution techniques described herein which identifies uncertainty in precipitation which may be propagated into other models. Additionally, the techniques described herein may be used to create recommendations and alerts for farmers, insurance companies, and hydrologists, thereby allowing for a more effective response to particular weather conditions.

6. EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

7. ADDITIONAL DISCLOSURE

1. A method comprising: receiving over a network at the digital weather computing system comprising one or more processors and digital memory, electronic digital data comprising a plurality of values representing radar reflectivity measurements at a particular location during a particular period of time; creating a probabilistic distribution of rainfall drop sizes; sampling a plurality of drop size values from the probabilistic distribution of rainfall drop sizes; computing a plurality of rainfall rates by, for each drop size value of the plurality of drop size values, computing a corresponding rainfall rate using the drop size value and one or more reflectivity values of the plurality of reflectivity values representing radar reflectivity measurements at the particular location during the particular period of time; and computing a probability distribution of precipitation intensities from the plurality of rainfall rates for the particular location.

2. The method of Clause 1, wherein, creating the probabilistic distribution of rainfall drop sizes comprises constructing a gamma distribution of rainfall drop sizes that is consistent with the plurality of values representing radar reflectivity measurements at the particular location during the particular period of time.

3. The method of any of Clauses 1-2, further comprising: receiving, over a network at the digital weather computing system, risk data indicating occurrence of an event that is conditional, at least in part, on occurrence of a particular precipitation intensity; identifying, from the probability distribution of precipitation intensities, a probability of the occurrence of the particular precipitation intensity; based on the probability of the occurrence of the particular precipitation intensity, identifying a probability of occurrence of the event.

4. The method of Clause 3, further comprising sending from the digital weather computing system, to one or more computing devices, notification data identifying the event and the probability of occurrence of the event.

5. The method of any of Clauses 1-2, further comprising: receiving at the digital weather computing system, from a client computing device, electronic digital data comprising a plurality of location values representing geographic locations for one or more fields; wherein the plurality of location values representing geographic locations for the one or more fields includes a particular location value for the particular location; identifying, from the probability distribution of precipitation intensities at the particular location during the particular time period, a likely precipitation intensity; causing displaying, on the client computing device, a graphical user interface which includes an identification of the particular location, the likely precipitation intensity during the particular time period for the particular location, and the probability distribution of precipitation intensities during the particular time period for the particular location.

6. The method of any of Clauses 1-2, further comprising: receiving, from a client computing device, electronic digital data comprising a plurality of location values representing geographic locations of one or more fields and a plurality of crop values representing crop information for one or more crops on the one or more fields; modeling a plurality of precipitation effects on the one or more crops and a probability of each of the plurality of precipitation effects on the one or more crops based, at least in part, on the probability distribution of precipitation intensities; causing displaying, on the client computing device, a graphical user interface which includes an identification of the particular location, an identification of the one or more crops, the plurality of precipitation effects on the one or more crops, and the probability of each of the plurality of precipitation effects on the one or more crops.

7. The method of Clause 6, wherein modeling the plurality of precipitation effects on the one or more crops and the probability of each of the plurality of precipitation effects on the one or more crops based, at least in part, on the probability distribution of precipitation intensities comprises: generating a crop model that models growth of the one or more crops based, at least in part, on water and nutrient availability to the one or more crops; estimating, from the probability distribution of precipitation intensities, a likely precipitation intensity for the particular location during the particular period of time; creating, from the probability distribution of precipitation intensities, a range of precipitation intensities with corresponding probabilities for the particular location during the particular period of time; using the likely precipitation intensity as a precipitation input for the crop model and the range of precipitation intensities with corresponding probabilities as a variance input for the crop model.

What is claimed is:

1. A method comprising:
using a digital weather computing system, receiving over a network at the digital weather computing system comprising one or more processors and digital memory, electronic digital data comprising a plurality of values representing radar reflectivity measurements at a particular location at a particular instance in time;
using the digital weather computing system, receiving electronic digital data comprising a plurality of values representing radar reflectivity measurements at a plurality of neighboring locations within a particular horizontal distance of the particular location at the particular instance in time;
using digitally programmed drop size distribution creation instructions in the digital weather computing system, creating a probabilistic distribution of rainfall drop sizes, based, at least in part, on the plurality of values representing radar reflectivity measurements at the particular location at the particular instance in time;
using digitally programmed distribution sampling instructions in the digital weather computing system, sampling a plurality of drop size values from the probabilistic distribution of rainfall drop sizes;
using digitally programmed precipitation intensity computation instructions in the digital weather computing system, computing a plurality of rainfall rates by, for each drop size value of the plurality of drop size values, computing a corresponding rainfall rate using the drop size value and one or more reflectivity values of the plurality of reflectivity values representing radar reflectivity measurements at the particular location at the particular instance in time;
using digitally programmed fertility advisor instructions in the digital weather computing system, computing and displaying a probability distribution of precipitation intensities from the plurality of rainfall rates for the particular location, computing the probability distribution of precipitation intensities comprising constraining one or more parameters of the probability distribution of precipitation intensities with the plurality of values representing radar reflectivity measurements at the particular location and one or more of the plurality of values representing radar reflectivity measurements at the plurality of neighboring locations within the particular horizontal distance of the particular location.

2. The method of claim 1, further comprising:
using the digital weather computing system, receiving, over a network at the digital weather computing system, risk data indicating occurrence of an event that is conditional, at least in part, on occurrence of a particular precipitation intensity;
using digitally programmed risk evaluation instructions of the digital weather computing system, identifying, from the probability distribution of precipitation intensities, a probability of the occurrence of the particular precipitation intensity;
using digitally programmed risk evaluation instructions of the digital weather computing system, based on the probability of the occurrence of the particular precipitation intensity, identifying a probability of occurrence of the event.

3. The method of claim 2, further comprising sending from the digital weather computing system, to one or more computing devices, notification data identifying the event and the probability of occurrence of the event.

4. The method of claim 1, further comprising:
receiving at the digital weather computing system, from a client computing device, electronic digital data comprising a plurality of location values representing geographic locations for one or more fields;
wherein the plurality of location values representing geographic locations for the one or more fields includes a particular location value for the particular location;
using digitally programmed fertility advisory instructions of the digital weather computing system, identifying, from the probability distribution of precipitation intensities at the particular location at the particular instance in time, a likely precipitation intensity;
causing displaying, on the client computing device, a graphical user interface which includes an identification of the particular location, the likely precipitation intensity at the particular instance in time for the particular location, and the probability distribution of precipitation intensities at the particular instance in time for the particular location.

5. The method of claim 1, further comprising:
receiving, from a client computing device, electronic digital data comprising a plurality of location values representing geographic locations of one or more fields and a plurality of crop values representing crop information for one or more crops on the one or more fields;
using digitally programmed fertility advisor instructions of the digital weather computing system, modeling a plurality of precipitation effects on the one or more crops and a probability of each of the plurality of precipitation effects on the one or more crops based, at least in part, on the probability distribution of precipitation intensities;
causing displaying, on the client computing device, a graphical user interface which includes an identification of the particular location, an identification of the one or more crops, the plurality of precipitation effects on the one or more crops, and the probability of each of the plurality of precipitation effects on the one or more crops.

6. The method of claim 5, wherein using digitally programmed fertility advisor instructions of the digital weather computing system, modeling the plurality of precipitation effects on the one or more crops and the probability of each of the plurality of precipitation effects on the one or more crops based, at least in part, on the probability distribution of precipitation intensities comprises:
generating a crop model that models growth of the one or more crops based, at least in part, on water and nutrient availability to the one or more crops;
estimating, from the probability distribution of precipitation intensities, a likely precipitation intensity for the particular location at the particular instance in time;
creating, from the probability distribution of precipitation intensities, a range of precipitation intensities with corresponding probabilities for the particular location at the particular instance in time;
using the likely precipitation intensity as a precipitation input for the crop model and the range of precipitation intensities with corresponding probabilities as a variance input for the crop model.

7. The method of claim 1, wherein, using digitally programmed drop size distribution creation instructions in the digital weather computing system, creating the probabilistic distribution of rainfall drop sizes comprises constructing a gamma distribution of rainfall drop sizes that is consistent with the plurality of values representing radar reflectivity measurements at the particular location at the particular instance in time.

8. The method of claim 1,
wherein the plurality of values representing reflectivity measurements at a plurality of neighboring locations within a particular horizontal distance of the particular location are at a plurality of instances in time within a particular period of time from the particular instance in time.

9. The method of claim 8, further comprising:
determining that reflectivity measurements at a second location and at a second instance in time correspond to reflectivity measurements at the particular location and particular instance in time;
modeling a plurality of changes of a plurality of drop sizes from the particular location at the particular instance in time to the second location at the second instance in time;
wherein constraining the one or more parameters comprises constraining the one or more parameters of the probability distribution of precipitation intensities to be consistent with the plurality of values representing reflectivity measurements at the particular location at the particular instance in time and the modeled plurality of changes of the plurality of drop sizes from the first location at the first instance in time to the second location at the second instance in time.

10. A method comprising:
using a digital weather computing system, receiving over a network at the digital weather computing system comprising one or more processors and digital memory, electronic digital data comprising a plurality of values representing radar reflectivity measurements at a particular location at a particular instance in time;
using the digital weather computing system, receiving electronic digital data comprising a plurality of values representing reflectivity measurements at the particular location at a plurality of instances in time within a particular period of time from the particular instance in time;
using digitally programmed drop size distribution creation instructions in the digital weather computing system, creating a probabilistic distribution of rainfall drop sizes, based, at least in part, on the plurality of values representing radar reflectivity measurements at the particular location at the particular instance in time;
using digitally programmed distribution sampling instructions in the digital weather computing system, sampling a plurality of drop size values from the probabilistic distribution of rainfall drop sizes;
using digitally programmed precipitation intensity computation instructions in the digital weather computing system, computing a plurality of rainfall rates by, for each drop size value of the plurality of drop size values, computing a corresponding rainfall rate using the drop size value and one or more reflectivity values of the plurality of reflectivity values representing radar reflectivity measurements at the particular location at the particular instance in time;
using digitally programmed fertility advisor instructions in the digital weather computing system, computing and displaying a probability distribution of precipitation intensities from the plurality of rainfall rates for the particular location, computing the probability distribution of precipitation intensities comprising constraining one or more parameters of the probability distribution of precipitation intensities to be consistent with the one or more of the plurality of values representing radar reflectivity measurements at the particular instance in time and the plurality of values representing radar reflectivity measurements at the plurality of instances in time within the particular period of time from the particular instance in time.

11. The method of claim 10, further comprising:
using the digital weather computing system, receiving, over a network at the digital weather computing system, risk data indicating occurrence of an event that is conditional, at least in part, on occurrence of a particular precipitation intensity;
using digitally programmed risk evaluation instructions of the digital weather computing system, identifying, from the probability distribution of precipitation intensities, a probability of the occurrence of the particular precipitation intensity;
using digitally programmed risk evaluation instructions of the digital weather computing system, based on the probability of the occurrence of the particular precipitation intensity, identifying a probability of occurrence of the event.

12. The method of claim 11, further comprising sending from the digital weather computing system, to one or more computing devices, notification data identifying the event and the probability of occurrence of the event.

13. The method of claim 10, further comprising:
receiving at the digital weather computing system, from a client computing device, electronic digital data comprising a plurality of location values representing geographic locations for one or more fields;
wherein the plurality of location values representing geographic locations for the one or more fields includes a particular location value for the particular location;
using digitally programmed fertility advisory instructions of the digital weather computing system, identifying, from the probability distribution of precipitation intensities at the particular location at the particular instance in time, a likely precipitation intensity;
causing displaying, on the client computing device, a graphical user interface which includes an identification of the particular location, the likely precipitation intensity at the particular instance in time for the particular location, and the probability distribution of precipitation intensities at the particular instance in time for the particular location.

14. The method of claim 10, further comprising:
receiving, from a client computing device, electronic digital data comprising a plurality of location values representing geographic locations of one or more fields and a plurality of crop values representing crop information for one or more crops on the one or more fields;
using digitally programmed fertility advisor instructions of the digital weather computing system, modeling a plurality of precipitation effects on the one or more crops and a probability of each of the plurality of precipitation effects on the one or more crops based, at least in part, on the probability distribution of precipitation intensities;

causing displaying, on the client computing device, a graphical user interface which includes an identification of the particular location, an identification of the one or more crops, the plurality of precipitation effects on the one or more crops, and the probability of each of the plurality of precipitation effects on the one or more crops.

15. The method of claim 14, wherein using digitally programmed fertility advisor instructions of the digital weather computing system, modeling the plurality of precipitation effects on the one or more crops and the probability of each of the plurality of precipitation effects on the one or more crops based, at least in part, on the probability distribution of precipitation intensities comprises:
generating a crop model that models growth of the one or more crops based, at least in part, on water and nutrient availability to the one or more crops;
estimating, from the probability distribution of precipitation intensities, a likely precipitation intensity for the particular location at the particular instance in time;
creating, from the probability distribution of precipitation intensities, a range of precipitation intensities with corresponding probabilities for the particular location at the particular instance in time;
using the likely precipitation intensity as a precipitation input for the crop model and the range of precipitation intensities with corresponding probabilities as a variance input for the crop model.

16. The method of claim 10, wherein, using digitally programmed drop size distribution creation instructions in the digital weather computing system, creating the probabilistic distribution of rainfall drop sizes comprises constructing a gamma distribution of rainfall drop sizes that is consistent with the plurality of values representing radar reflectivity measurements at the particular location at the particular instance in time.

17. A data processing system comprising:
a memory;
one or more processors coupled to the memory and configured to:
receive over a network electronic digital data comprising a plurality of values representing radar reflectivity measurements at a particular location at a particular instance in time;
receive electronic digital data comprising a plurality of values representing radar reflectivity measurements at a plurality of neighboring locations within a particular horizontal distance of the particular location at the particular instance in time;
create a probabilistic distribution of rainfall drop sizes;
sample a plurality of drop size values from the probabilistic distribution of rainfall drop sizes;
compute a plurality of rainfall rates by, for each drop size value of the plurality of drop size values, computing a corresponding rainfall rate using the drop size value and one or more reflectivity values of the plurality of reflectivity values representing radar reflectivity measurements at the particular location at the particular instance in time;
compute and display a probability distribution of precipitation intensities from the plurality of rainfall rates for the particular location, computing the probability distribution of precipitation intensities comprising constraining one or more parameters of the probability distribution of precipitation intensities to be consistent with the plurality of values representing radar reflectivity measurements at the particular location and one or more of the plurality of values representing radar reflectivity measurements at the plurality of neighboring locations within the particular horizontal distance of the particular location.

18. The data processing system of claim 17, wherein the one or more processors are further configured to:
receive over a network risk data indicating occurrence of an event that is conditional, at least in part, on occurrence of a particular precipitation intensity;
identify, from the probability distribution of precipitation intensities, a probability of the occurrence of the particular precipitation intensity;
based on the probability of the occurrence of the particular precipitation intensity, identify a probability of occurrence of the event.

19. The data processing system of claim 18, wherein the one or more processors are further configured to send, to one or more computing devices, notification data identifying the event and the probability of occurrence of the event.

20. The data processing system of claim 17, wherein the one or more processors are further configured to:
receive, from a client computing device, electronic digital data comprising a plurality of location values representing geographic locations for one or more fields;
wherein the plurality of location values representing geographic locations for the one or more fields includes a particular location value for the particular location;
identify, from the probability distribution of precipitation intensities at the particular location at the particular instance in time, a likely precipitation intensity;
cause displaying, on the client computing device, a graphical user interface which includes an identification of the particular location, the likely precipitation intensity at the particular instance in time for the particular location, and the probability distribution of precipitation intensities at the particular instance in time for the particular location.

21. The data processing system of claim 17, wherein the one or more processors are further configured to:
receive, from a client computing device, electronic digital data comprising a plurality of location values representing geographic locations of one or more fields and a plurality of crop values representing crop information for one or more crops on the one or more fields;
model a plurality of precipitation effects on the one or more crops and a probability of each of the plurality of precipitation effects on the one or more crops based, at least in part, on the probability distribution of precipitation intensities;
causing displaying, on the client computing device, a graphical user interface which includes an identification of the particular location, an identification of the one or more crops, the plurality of precipitation effects on the one or more crops, and the probability of each of the plurality of precipitation effects on the one or more crops.

22. The data processing system of claim 21, wherein the one or more processors are further configured to:
model the plurality of precipitation effects on the one or more crops and the probability of each of the plurality of precipitation effects on the one or more crops based, at least in part, on the probability distribution of precipitation intensities by:
generating a crop model that models growth of the one or more crops based, at least in part, on water and nutrient availability to the one or more crops;

estimating, from the probability distribution of precipitation intensities, a likely precipitation intensity for the particular location at the particular instance in time;

creating, from the probability distribution of precipitation intensities, a range of precipitation intensities with corresponding probabilities for the particular location at the particular instance in time;

using the likely precipitation intensity as a precipitation input for the crop model and the range of precipitation intensities with corresponding probabilities as a variance input for the crop model.

23. The data processing system of claim 17, wherein the one or more processors are further configured to create the probabilistic distribution of rainfall drop sizes by constructing a gamma distribution of rainfall drop sizes that is consistent with the plurality of values representing radar reflectivity measurements at the particular location at the particular instance in time.

24. The data processing system of claim 17, wherein the plurality of values representing reflectivity measurements at a plurality of neighboring locations within a particular horizontal distance of the particular location are at a plurality of instances in time within a particular period of time from the particular instance in time.

25. The data processing system of claim 24, wherein the one or more processors are further configured to:
determine that reflectivity measurements at a second location and at a second instance in time correspond to reflectivity measurements at the particular location and particular instance in time;
model a plurality of changes of a plurality of drop sizes from the particular location at the particular instance in time to the second location at the second instance in time;
wherein constraining the one or more parameters comprises constraining the one or more parameters of the probability distribution of precipitation intensities to be consistent with the plurality of values representing reflectivity measurements at the particular location at the particular instance in time and the modeled plurality of changes of the plurality of drop sizes from the first location at the first instance in time to the second location at the second instance in time.

26. A data processing system comprising:
a memory;
one or more processors coupled to the memory and configured to:
receive over a network electronic digital data comprising a plurality of values representing radar reflectivity measurements at a particular location at a particular instance in time;
receive electronic digital data comprising a plurality of values representing reflectivity measurements at the particular location at a plurality of instances in time within a particular period of time from the particular instance in time;
create a probabilistic distribution of rainfall drop sizes;
sample a plurality of drop size values from the probabilistic distribution of rainfall drop sizes:
compute a plurality of rainfall rates by, for each drop size value of the plurality of drop size values, computing a corresponding rainfall rate using the drop size value and one or more reflectivity values of the plurality of reflectivity values representing radar reflectivity measurements at the particular location at the particular instance in time;
compute and display a probability distribution of precipitation intensities from the plurality of rainfall rates for the particular location, computing the probability distribution of precipitation intensities comprising constraining one or more parameters of the probability distribution of precipitation intensities to be consistent with one or more of the plurality of values representing radar reflectivity measurements at the particular instance in time and the plurality of values representing radar reflectivity measurements at the plurality of instances in time within the particular period of time from the particular instance in time.

27. The data processing system of claim 26, wherein the one or more processors are further configured to:
receive over a network risk data indicating occurrence of an event that is conditional, at least in part, on occurrence of a particular precipitation intensity;
identify, from the probability distribution of precipitation intensities, a probability of the occurrence of the particular precipitation intensity;
based on the probability of the occurrence of the particular precipitation intensity, identify a probability of occurrence of the event.

28. The data processing system of claim 27, wherein the one or more processors are further configured to send, to one or more computing devices, notification data identifying the event and the probability of occurrence of the event.

29. The data processing system of claim 26, wherein the one or more processors are further configured to:
receive, from a client computing device, electronic digital data comprising a plurality of location values representing geographic locations for one or more fields;
wherein the plurality of location values representing geographic locations for the one or more fields includes a particular location value for the particular location;
identify, from the probability distribution of precipitation intensities at the particular location at the particular instance in time, a likely precipitation intensity;
cause displaying, on the client computing device, a graphical user interface which includes an identification of the particular location, the likely precipitation intensity at the particular instance in time for the particular location, and the probability distribution of precipitation intensities at the particular instance in time for the particular location.

30. The data processing system of claim 26, wherein the one or more processors are further configured to:
receive, from a client computing device, electronic digital data comprising a plurality of location values representing geographic locations of one or more fields and a plurality of crop values representing crop information for one or more crops on the one or more fields;
model a plurality of precipitation effects on the one or more crops and a probability of each of the plurality of precipitation effects on the one or more crops based, at least in part, on the probability distribution of precipitation intensities;
causing displaying, on the client computing device, a graphical user interface which includes an identification of the particular location, an identification of the one or more crops, the plurality of precipitation effects on the one or more crops, and the probability of each of the plurality of precipitation effects on the one or more crops.

31. The data processing system of claim 30, wherein the one or more processors are further configured to:
- model the plurality of precipitation effects on the one or more crops and the probability of each of the plurality of precipitation effects on the one or more crops based, at least in part, on the probability distribution of precipitation intensities by:
- generating a crop model that models growth of the one or more crops based, at least in part, on water and nutrient availability to the one or more crops;
- estimating, from the probability distribution of precipitation intensities, a likely precipitation intensity for the particular location at the particular instance in time;
- creating, from the probability distribution of precipitation intensities, a range of precipitation intensities with corresponding probabilities for the particular location at the particular instance in time;
- using the likely precipitation intensity as a precipitation input for the crop model and the range of precipitation intensities with corresponding probabilities as a variance input for the crop model.

32. The data processing system of claim 26, wherein the one or more processors are further configured to create the probabilistic distribution of rainfall drop sizes by constructing a gamma distribution of rainfall drop sizes that is consistent with the plurality of values representing radar reflectivity measurements at the particular location at the particular instance in time.

* * * * *